(12) United States Patent
Chen

(10) Patent No.: US 8,079,745 B2
(45) Date of Patent: Dec. 20, 2011

(54) BACKLIGHT MODULE

(75) Inventor: Yan Chen, Beijing (CN)

(73) Assignee: Beijing Boe Optoelectronics Technology Co., Ltd., Beijing (CN)

( * ) Notice: Subject to any disclaimer, the term of this patent is extended or adjusted under 35 U.S.C. 154(b) by 197 days.

(21) Appl. No.: 12/543,862

(22) Filed: Aug. 19, 2009

(65) Prior Publication Data

US 2010/0053937 A1 Mar. 4, 2010

(30) Foreign Application Priority Data

Aug. 29, 2008 (CN) ...................... 2008 2 0110278 U

(51) Int. Cl.
*F21V 7/04* (2006.01)

(52) U.S. Cl. ........................................ 362/621; 362/614
(58) Field of Classification Search .................. 362/614, 362/621–625; 349/65
See application file for complete search history.

(56) References Cited

U.S. PATENT DOCUMENTS 6,808,281 B2 * 10/2004 Ho ................................ 362/600

* cited by examiner

*Primary Examiner* — Jason Moon Han
(74) *Attorney, Agent, or Firm* — Ladas & Parry LLP

(57) ABSTRACT

An embodiment of the present invention relates to a backlight module comprising a back plate, a light guide plate provided on the back plate and a light source provided at a side of the light guide plate. A side and lower surface of the light guide plate facing the lamp tubes is a concave surface. The weight of the backlight module and the cost can be largely reduced without change of the light efficiency.

9 Claims, 2 Drawing Sheets

BACKLIGHT MODULE

BACKGROUND

Embodiments of the present invention relate to a light guide plate.

Currently, liquid crystal displays (LCDs), especially thin-film transistor liquid crystal displays (TFT-LCDs), have been commonly used. Because a liquid crystal layer in a LCD cannot emit light by itself, a light source is required for the LCD so as to realize image display. In a transmissive type LCD, a backlight module is employed to provide a light source of high and uniform brightness.

FIG. 1 is a cross sectional view of a conventional LCD backlight module. As shown in FIG. 1, the backlight module comprises an optical film layer 1, a light guide plate (LGP) 4, lamp tubes 3, lamp covers 5, and a backlight lamp reflecting plate 2. The optical film layer 1 usually comprises optical films such as an upper diffusing sheet, a prism sheet, a lower diffusing sheet and the like, and can be selectively used as required. The lamp tubes 3 and the lamp covers 5 are provided on both sides of the light guide plate 4. The backlight lamp reflecting plate 2 is disposed below the lamp tubes 3 and the light guide plate 4. In this kind of backlight module, the lamp tubes 3 are the light emitting components and emit light into the light guide plate 4, through which the light is in turn directed into liquid crystal panel positioned above the optical film layer 1 for displaying images.

The above mentioned backlight module is of a side light source mode and has at least the following shortcomings: the light guide plate used is generally in a rectangular parallelepiped shape and is relatively heavy, which is inconsistent with the lightness and portability requirement on a LCD; as the lamp cover is needed to improve the light efficiency, the cost of LCD is increased; and the reflecting plate or reflecting film and the like used therein increases not only the cost but also the weight.

SUMMARY

According to an embodiment of the present invention, a backlight module is provided, which comprises a back plate, a light guide plate provided on the back plate, and a light source provided at a side of the light guide plate. A side and lower surface of the light guide plate facing the lamp tube is a concave surface.

The backlight module according to the embodiments of the present invention employs novel structures for the light guide plate and the back plate, so that the weight of the backlight module and the cost can be largely reduced without change of the light efficiency, and the light utilization efficiency can be improved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the following detailed description.

BRIEF DESCRIPTION OF THE DRAWINGS

The present invention will become more fully understood from the detailed description given hereinafter and the accompanying drawings which are given by way of illustration only, and thus are not limitative of the present invention and wherein.

DETAILED DESCRIPTION OF THE PREFERRED EMBODIMENTS

Further detailed description of the present invention will be made through embodiments of thereof with reference to the drawings.

Figure 1:
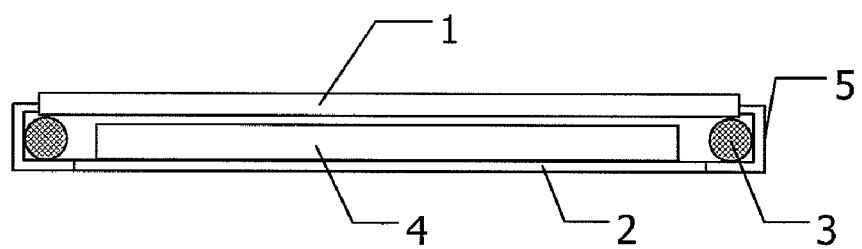
FIG. 1 is a cross sectional view of a conventional LCD backlight module.
Figure 2:
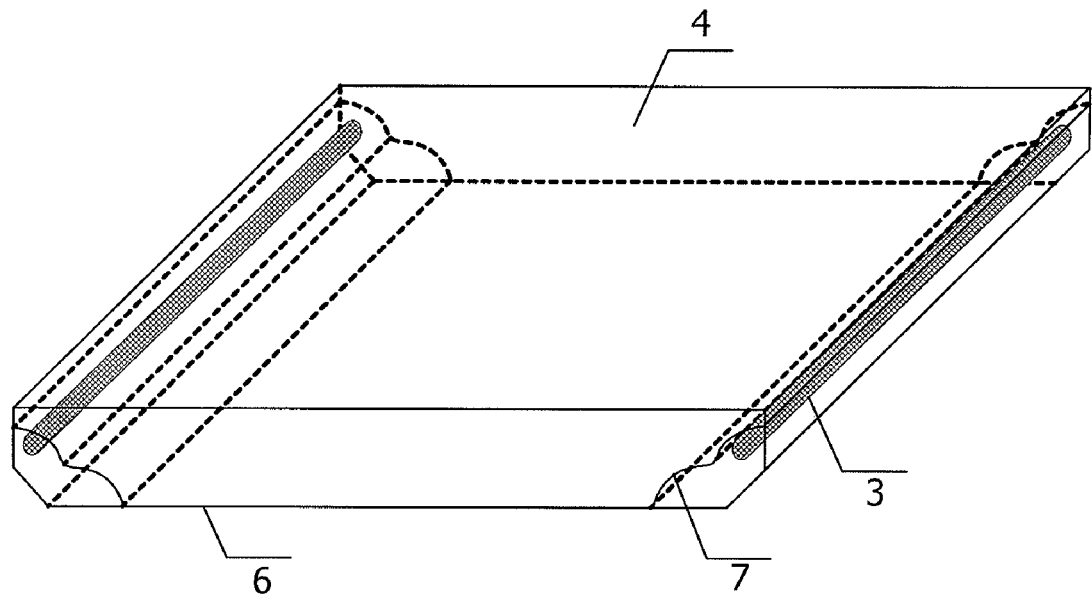
FIG. 2 is a schematic view of the backlight module according to a first embodiment of the present invention.

FIG. 2 is a schematic view of a backlight module according to a first embodiment of the present invention. As shown in FIG. 2, the backlight module of the present embodiment comprises a back plate 6, a light guide plate 4 provided on the back plate 6, and a light source 3 (e.g., a cold cathode fluorescent lamp (CCFL)) provided on two sides of the light guide plate 4. A side and lower surface 7 of the light guide plate 4 facing the lamp tube 3 comprises a concave surface 7. The light source 3 may be replaced with a hot cathode fluorescent lamp (HCFL), or light emitting diodes (LEDs).

Figure 3:
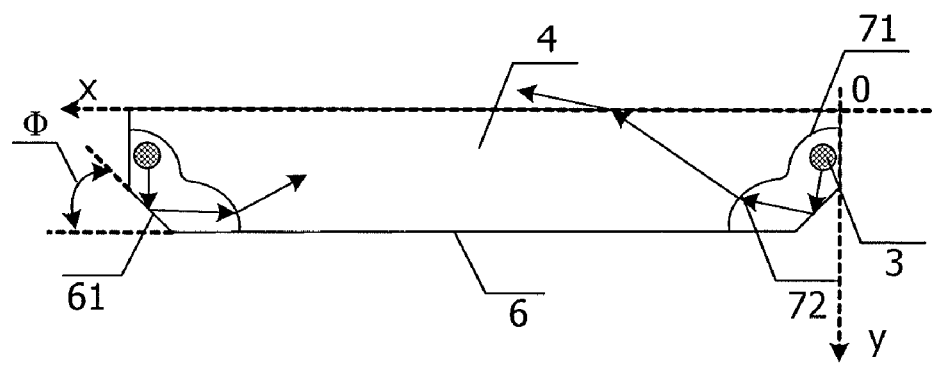
FIG. 3 is a cross sectional view of the backlight module of the first embodiment shown in FIG. 2.

Preferably, the side and lower surface 7 of the light guide plate 4 comprises at least two concave surfaces, and the lamp tube 3 is disposed in one of the concave surfaces. FIG. 3 is a cross sectional view of the backlight module of the first embodiment shown in FIG. 2. As shown in FIG. 3, the at least two concave surfaces comprise a first concave surface 71 adjacent to the side surface of the light guide plate 4 and a second concave surface 72 adjacent to the lower surface of the light guide plate 4, and the lamp tube 3 is disposed in the first concave surface 71. The joint between the first concave surface 71 and the second concave surface 72 can be smoothed to form a transitional curved surface. Further, the first concave surface 71 and the second concave surface 72 each may be a concave surface having an arc-shaped cross section. A side surface of the back plate 6 facing the side and lower surface 7 of the light guide plate 4 is at least one inclined surface. In the present embodiment, this inclined surface is an inclined planar surface 61 parallel to the axis of the lamp tube. An angle Φ between the inclined planar surface 61 and the lower surface of the back plate 6 is preferably in the range of $0° < \Phi \leq 45°$. As shown in FIG. 3, the lamp tube 3 emits light, a portion of the emitted light enters the light guide plate 4 directly, and another portion of the emitted light is reflected on the back plate 6 and then enters the light guide plate 4 through the second concave surface 72. Further, the side and lower surface 7 of the light guide plate 4 may comprise at least two concave surfaces, which comprise one concave surface and one planar surface or a plurality of concave surfaces and a plurality of planar surfaces.

Figure 4:
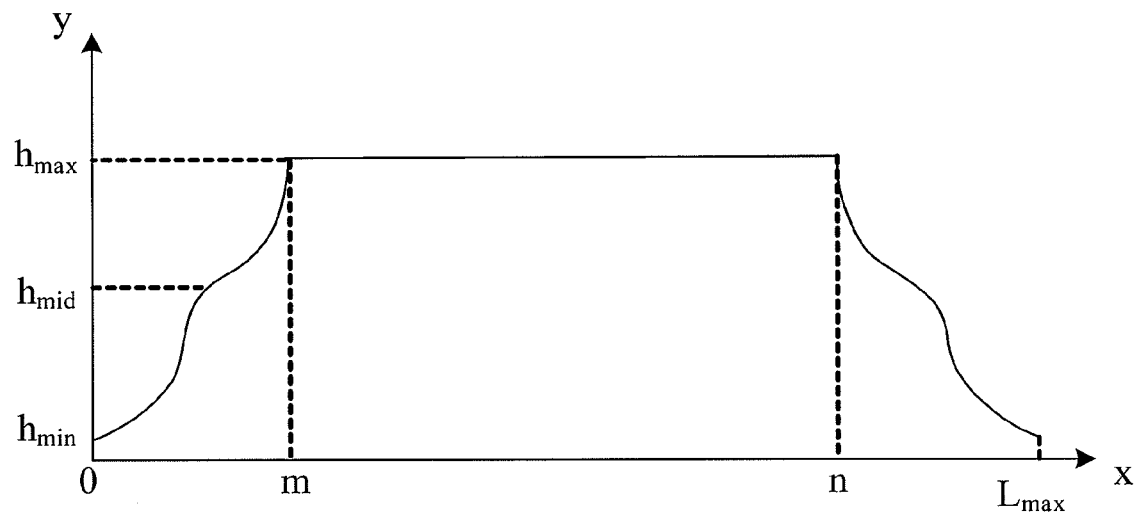
FIG. 4 is a graph showing the contour of a concaved surface.

As shown in FIG. 3, assuming that the upper surface of the light guide plate 4 is in the x axis direction, and the thickness direction is in the y axis direction, and the origin 0 is positioned as shown in FIG. 3, the graph showing the contour of the concave surface in FIG. 4 can satisfy formula (1):

$$y = \begin{cases} ax^4 + bx^3 + cx^2 + dx + e; (0 < x < m, a > 0, e > 0) \\ h_{max}; (m \leq x \leq n) \\ aX^4 + bX^3 + cX^2 + dX + e; \begin{pmatrix} n < x \leq L_{max}, \\ X = L_{max} - x, a > 0, e > 0 \end{pmatrix} \end{cases} \quad (1)$$

where, x is the length of the upper surface of the light guide plate in the x direction; y is the thickness of the light guide plate; $h_{max}$ is the maximum thickness of the light guide plate in the y direction; $h_{mid}$ is the intermediate value of the thickness of the light guide plate in the y direction, that is, $h_{mid}$ is the thickness corresponding to the joint point or inflection point between the first concave surface and the second concave surface; $h_{min}$ is the minimum thickness of the light guide plate in the y direction, which, in an actual production, generally is not 0; $L_{max}$ is the maximum length of the upper surface of the light guide plate in the x direction. When $0<x<m$, $a>0$, and $e>0$, the relationship between the thickness y and the length x of the light guide plate satisfies the formula: $y=ax^4+bx^3+cx^2+dx+e$; when $n \leq x \leq m$, the thickness y of the light guide plate is the maximum $h_{max}$; and when $n<x<L_{max}$, $a>0$, $e>0$ and $X=L_{max}-x$, the relationship between the thickness y and the length x of the light guide plate satisfies the formula: $y=aX^4+bX^3+cX^2+dX+e$.

The backlight module for a liquid crystal display according to the first embodiment of the present invention employs a light guide plate structure in which the side and lower surface comprises concave surfaces, so that it is possible to decrease the weight of the light guide plate and thus of the backlight module. Further, the lamp tube can be disposed in the concave surface, which is favorable for collecting the light into the light guide plate, reducing the light loss and improving the light efficiency, and therefore energy consumption and cost is reduced.

Figure 5:
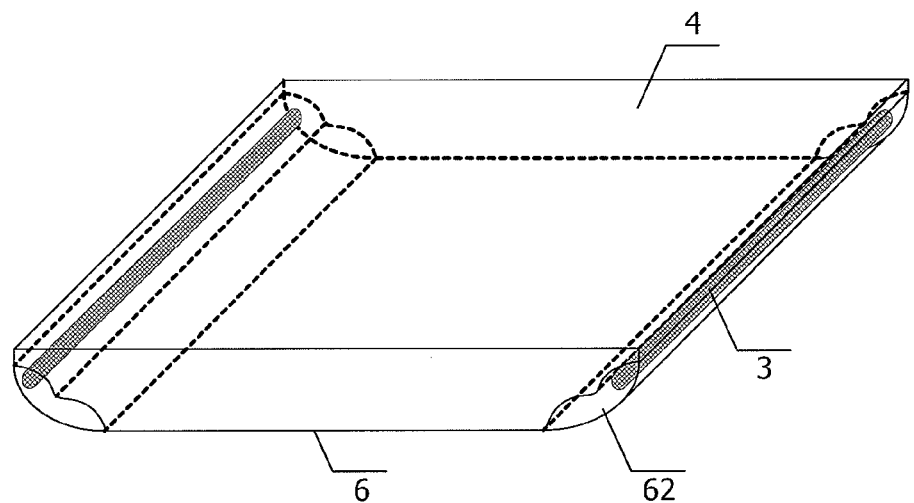
FIG. 5 is a schematic view of the backlight module according to a second embodiment of the present invention.

FIG. 5 is a schematic view of a backlight module according to a second embedment of the present invention. As shown in FIG. 5, the present embodiment is made based on the aforementioned backlight module of the first embodiment. In the present embodiment, the side surface of the back plate 6 facing the side and lower surface 7 of the light guide plate 4 is at least one inclined surface. The inclined surface is preferably an inclined and curved surface 62. Further, the inner surface of the back plate 6 facing the light guide plate 4 may be a surface subjected to a mirror polishing and having a reflectivity of approximately 100%. Also, the back plate 6 may be made of a metal plate or a plastic plate with a reflective layer formed thereon.

The backlight module according to the second embodiment of the present invention effectively improves the light utilization efficiency of the backlight module and reduces the light loss by employing a structure of an inclined and curved surface and applying the mirror polishing process on the inner surface of the back light facing the light guide plate to obtain a relatively high reflectivity.

The backlight module of the present invention employs novel structures for the light guide plate and the back plate, so that the weight of the backlight module and the cost can be largely reduced without degradation of the light efficiency. As compared with the conventional backlight modules, the weight of the backlight module of the present invention can be reduced by up to 30%, and the cost can be reduced by above 20%. Moreover, it is made possible to improve light utilization efficiency, reduce light loss and save energy.

The embodiments of the invention being thus described, it will be obvious that the same may be varied in many ways. Such variations are not to be regarded as a departure from the spirit and scope of the invention, and all such modifications as would be obvious to those skilled in the art are intended to be comprised within the scope of the following claims.

What is claimed is:

1. A backlight module, comprising:
a back plate;
a light guide plate provided on the back plate; and
a light source provided at a side of the light guide plate, wherein a side and lower surface of the light guide plate facing the light source comprises a concave surface, and
wherein a side surface of the back plate facing the side and lower surface of the light guide plate comprises at lease one inclined surface, and the inclined surface is an inclined planar surface parallel to an axis of the light source, wherein a contour of the concave surface satisfies the following formula:

$$y = \begin{cases} ax^4 + bx^3 + cx^2 + dx + e; (0 < x < m, a > 0, e > 0) \\ h_{max}; (m \leq x \leq n) \\ aX^4 + bX^3 + cX^2 + dX + e; (n < x \leq L_{max}, X = L_{max} - x, a > 0, e > 0) \end{cases}$$

wherein, x is a length of an upper surface of the light guide plate in an x direction, y is a thickness of the light guide plate; $h_{max}$ is the maximum thickness of the light guide plate in the y direction; $h_{mid}$ is the minimum thickness of the light guide plate in the y direction, which, in actual production, generally is not 0; $L_{max}$ is the maximum length of the upper surface of the light guide plate in the x direction.

2. The backlight module of claim 1, wherein the side and lower surface of the light guide plate comprises at least two concave surfaces, and the light source is disposed in one of the concave surfaces.

3. The backlight module of claim 2, wherein the at least two concave surfaces comprise a first concave surface adjacent to a side surface of the light guide plate and a second concave surface adjacent to a lower surface of the light guide plate, and the light source is disposed in the first concave surface.

4. The backlight of claim 3, wherein the first and the second concave surfaces are concave surfaces having an arc-shaped cross section.

5. The backlight module of claim 1, wherein an angle between the inclined planar surface and a lower surface of the back plate is in the range of 0°~45°.

6. The backlight module of claim 1, wherein an inner surface of the back plate facing the light guide plate is a mirror polished surface.

7. The backlight module of claim 1, wherein the inclined surface is a curved surface.

8. The backlight module of claim 1, wherein an inner surface of the back plate facing the light guide plate is a mirror polished surface.

9. The backlight module of claim 1, wherein the light source is selected from the group consisting of a cold cathode fluorescent lamp, a hot cathode fluorescent lamp, and a light emitting diode.

* * * * *